United States Patent
Guyader et al.

(10) Patent No.: US 9,169,806 B2
(45) Date of Patent: Oct. 27, 2015

(54) PROPULSION SYSTEM FOR FLYING MACHINE, PARTICULARLY FOR A MISSILE

(75) Inventors: Gilles Aime Yann Guyader, Saint Cezert (FR); Jean-Francois Rideau, Tournefeuille (FR); Andre Pfiffer, Saint Medard en Jalles (FR); Jean-Francois Doualle, Orsay (FR)

(73) Assignees: MICROTURBO SA, Toulouse (FR); MBDA France, Le Plessis-Robinson (FR); ROXEL France, Saint-Medard en Jalles (FR)

( * ) Notice: Subject to any disclaimer, the term of this patent is extended or adjusted under 35 U.S.C. 154(b) by 413 days.

(21) Appl. No.: 13/821,429

(22) PCT Filed: Sep. 8, 2011

(86) PCT No.: PCT/FR2011/052063
§ 371 (c)(1),
(2), (4) Date: Mar. 7, 2013

(87) PCT Pub. No.: WO2012/032273
PCT Pub. Date: Mar. 15, 2012

(65) Prior Publication Data
US 2013/0269313 A1    Oct. 17, 2013

(30) Foreign Application Priority Data
Sep. 10, 2010 (FR) ...................... 10 57214

(51) Int. Cl.
| | |
|---|---|
| F02K 9/00 | (2006.01) |
| F02C 7/27 | (2006.01) |
| F02K 9/30 | (2006.01) |
| F02K 9/78 | (2006.01) |
| F41A 33/02 | (2006.01) |
| F42B 15/10 | (2006.01) |

(52) U.S. Cl.
CPC ... F02K 9/00 (2013.01); F02C 7/27 (2013.01); F02K 9/30 (2013.01); F02K 9/78 (2013.01); F41A 33/02 (2013.01); F42B 15/10 (2013.01)

(58) Field of Classification Search
CPC .............. F02K 9/00; F02K 9/30; F02K 9/78; F02C 7/27; F42B 15/10
See application file for complete search history.

(56) References Cited

U.S. PATENT DOCUMENTS

| | | | | |
|---|---|---|---|---|
| 2,673,445 | A * | 3/1954 | Bruckmann | 60/225 |
| 2,676,457 | A * | 4/1954 | Kramer | 60/257 |
| 2,960,824 | A | 11/1960 | Plummer | |
| 5,131,223 | A * | 7/1992 | Owen | 60/263 |

FOREIGN PATENT DOCUMENTS

| | | |
|---|---|---|
| FR | 2 649 757 | 1/1991 |
| JP | 10 115255 | 5/1998 |

OTHER PUBLICATIONS

International Search Report Issued Jan. 16, 2012 in PCT/FR11/52063 Filed Sep. 8, 2011.

* cited by examiner

*Primary Examiner* — Craig Kim
(74) *Attorney, Agent, or Firm* — Oblon, McClelland, Maier & Neustadt, L.L.P.

(57) ABSTRACT

A propulsion system including: a booster; a turbojet engine; the booster including a chamber which is fixed to a rear casing of the turbojet engine by being arranged along the longitudinal axis thereof, which chamber includes at a rear a jet pipe and includes at least one charge and a mechanism initiating the charge; and gas bleed tubes connected to the booster and which are configured either for igniting the combustion chamber of the turbojet engine on for starting the turbine of the turbojet.

12 Claims, 1 Drawing Sheet

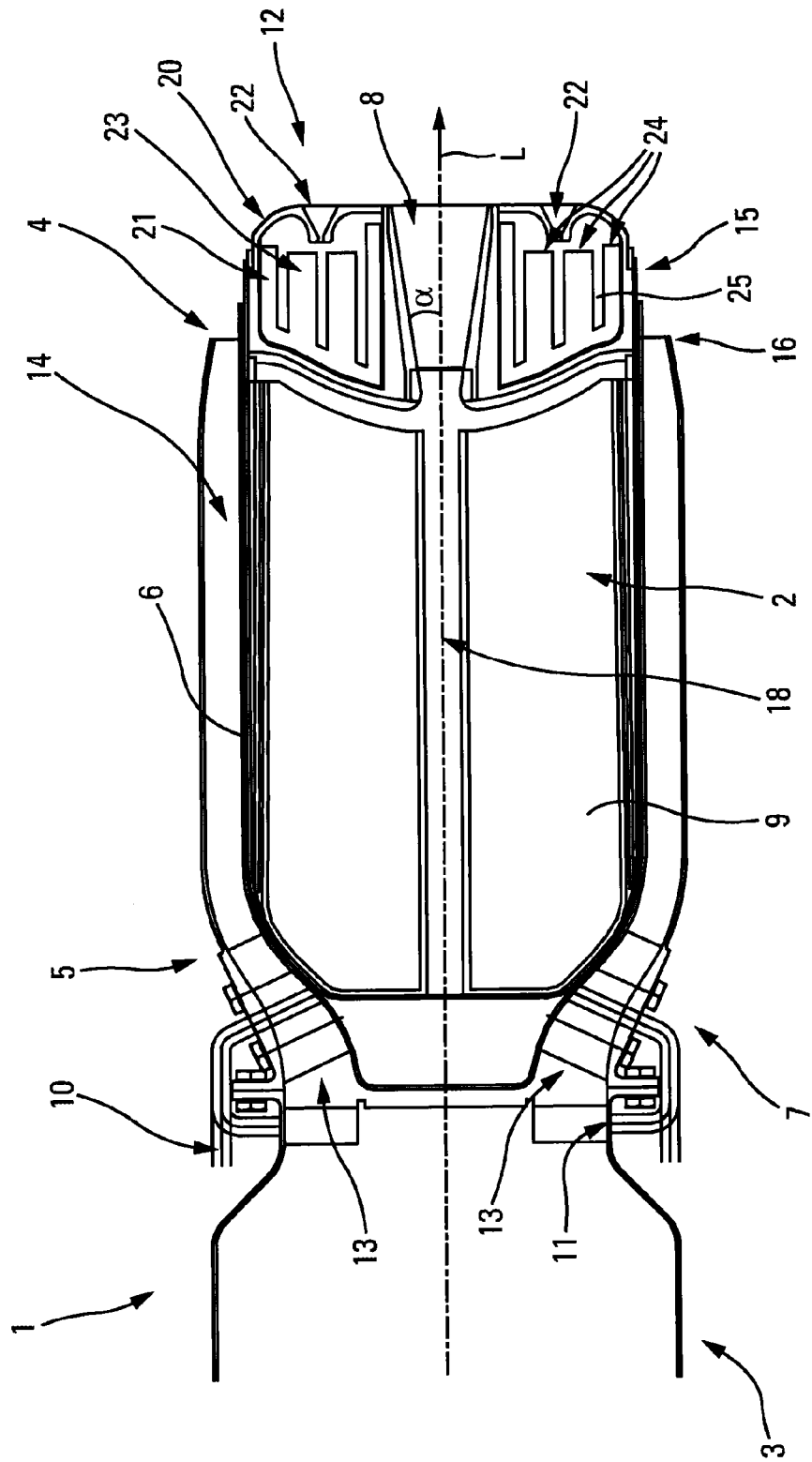

PROPULSION SYSTEM FOR FLYING MACHINE, PARTICULARLY FOR A MISSILE

The present invention relates to a propulsion system intended to propel a flying device, particularly an anti-tank missile.

Within the context of the present invention, said propulsion system comprises a turbojet which, in the usual way, comprises at least a compressor, a combustion chamber, a turbine and an ejection nozzle.

To improve the performance of such a propulsion system, notably at the time of initial increase in speed, it is known practice to add a booster of the solid rocket booster type to the turbojet.

This solution then consists in combining two different types of thruster. These two particular types of thruster have opposing design constraints, namely notably a high air flow rate with low levels of temperature (1300 K) and pressure (6 bar) in the case of the turbojet, and a low air flow rate with high levels of temperature (2500 K) and pressure (100 bar) in the case of the rocket motor.

These opposing design constraints of course impede the integration of these two types of thruster within one and the same propulsion system.

Hence, the usual solutions have involved combinations of distinctive propulsion architectures (turbojet and jettisonable solid rocket booster), with no concept of integration.

In general, the usual solutions contain booster devices positioned laterally or at the rear which are jettisoned once they have been used. Such jettisoning prevents a propulsion system of this type from being used on an anti-tank missile or a light anti-ship missile for use in a tactical theater of operations. This is because of the danger presented to friendly troops as the booster drops uncontrollably back onto the field of operations at the end of the booster phase.

As a result, such a propulsion system cannot be used for powering missiles of the anti-tank type, or even of the light anti-ship type. This therefore restricts this type of missile to short/medium-range use.

Furthermore, document FR-2 649 257 discloses a system intended to propel a missile. This propulsion system comprises a booster and a turbojet. The booster is incorporated into the rear part of the turbojet and is provided with a charge. The propulsion system also comprises a flame propagation tube which extends from the booster to the combustion chamber of the turbojet.

The present invention relates to a propulsion system intended to propel a flying device, which is of hybrid type (i.e. which has two different types of thruster), providing a solution to the aforementioned disadvantages.

To this end, according to the invention, said propulsion system of the type comprising a booster and a turbojet (which comprises at least a compressor, a combustion chamber, a turbine and an ejection nozzle), is notable in that:
   said booster is incorporated into the rear part of said turbojet, said booster comprising a chamber which is fixed to a casing of the turbojet, being positioned along the longitudinal axis thereof, which is fitted with a nozzle at the rear, and which is provided with at least one charge and with means of initiating said charge; and
   said propulsion system additionally comprises:
      at least one first gas bleed tube which is connected to the booster and which is intended to ignite the combustion chamber; and
      at least one second gas bleed tube which is also connected to the booster and which is intended to start the turbine.

Thus, by virtue of the invention, a booster provided with a charge which operates without ejecting heavy mechanical parts is incorporated, which means to say fixedly mounted in the way specified below, in the nozzle of the turbojet. Thus, this propulsion system provides a solution to the aforementioned disadvantages and is notably particularly well suited to use on an anti-tank missile or a light anti-ship missile, for use in a tactical theater of operations. This is because, thanks to the invention, friendly troops are not endangered at the end of the boost phase performed by said booster of the propulsion system, because no mechanical parts are ejected apart from a very lightweight (generally weighing of the order of 10 grams) diaphragm originating from the booster in the usual way and presenting no significant danger.

In addition, an arrangement of gas bleed tubes is provided that allows the functions of igniting the turbojet and of starting the turbine to be combined, these usually being performed by separate equipments (pyrotechnic ignition plugs and pyrotechnic starter cartridge in general), making these functions easier to produce and to implement.

Further, by incorporating the chamber of the booster along the axis of the turbojet, as specified hereinbelow, the present invention makes it possible to limit the problems of offset thrust that are inherent in the usual solutions in which the booster is off-centered (offset or laterally-mounted boosters).

In one preferred embodiment, the chamber of the booster is fixed to a rear casing of the turbojet by arms which are uniformly distributed about the periphery of the longitudinal axis of the turbojet. In this case, for preference, said first and second gas bleed tubes pass at least through some of said arms, which notably makes it easier to produce and allows the size to be reduced.

Furthermore, in one preferred embodiment, the chamber of the booster is of cylindrical shape, and the ejection nozzle of the turbojet surrounds said chamber in such a way as to define an annular space around the latter, which space is intended for the ejection of the gases from the turbojet.

This preferred embodiment makes it possible to limit the losses associated with the lengthening of the ejection nozzle and to limit the afterbody drag and the thermal obstruction associated with the hot gases of the booster during the boost phase.

In this preferred embodiment, advantageously, said booster protrudes rearwards beyond said ejection nozzle, which in particular makes it possible to avoid the gases ejected by the booster disturbing the operation of the turbojet after the boost phase.

For this same reason and advantageously, the nozzle of the booster is arranged in such a way that its axis of symmetry coincides with the longitudinal axis of the turbojet, and said nozzle widens toward the rear and has an angle of divergence that allows a gas ejected through said nozzle to reach a gas ejected by the ejection nozzle of the turbojet, at the rear of the propulsion system, at minimum a preset distance away.

Also advantageously, the charge of the booster has at least one central or peripheral passage for the circulation of the combustion gases to said nozzle of the booster and to feed into the gas bleeds.

As indicated hereinbelow, the propulsion system according to the invention is particularly well suited to use on an anti-tank missile (or a light anti-ship missile) which, in the usual way, is ejected from a launch tube when fired. In order to implement such ejection from a launch tube, the propulsion system according to the invention advantageously also comprises ejection means which are arranged at the rear of the booster.

In one preferred embodiment, said ejection means comprise an auxiliary booster provided with a plurality of individual nozzles which are arranged around and radially on the outside of the nozzle of the booster and which are evenly distributed around the periphery of said nozzle. In addition, to speed up combustion and be able to attain high velocities quickly, said auxiliary booster advantageously comprises a charge having concentric rings, which between them form passages intended for the ejection of the combustion gases.

When a missile like the aforementioned one is fired, the propulsion system according to the present invention therefore allows the following three successive phases to be carried out:
- an initial phase in which the missile is ejected from the launch tube, which is performed by said ejection means;
- a phase of acceleration after the missile has been ejected, which is implemented by said booster; and
- a cruising phase implemented by the turbojet, when a predetermined velocity has been reached.

The present invention also relates to a flying device, particularly an anti-tank missile or a light anti-ship missile.

According to the invention, said flying device comprises a propulsion system of hybrid type, like the abovementioned one, combining a booster and a turbojet.

The single FIGURE of the attached drawing will make it easy to understand how the invention may be embodied. This single FIGURE is a schematic view in cross section of a propulsion system according to the invention.

The propulsion system 1 according to the invention and depicted in the FIGURE is positioned at the rear of a flying device (not depicted), particularly an anti-tank missile or a light anti-ship missile and is intended to propel this flying device.

This propulsion system 1 is of the hybrid type comprising both a booster 2 and a turbojet 3. The turbojet 3 comprises, in the usual way, at least a compressor, a combustion chamber, a turbine and an ejection nozzle 4.

According to the invention, said booster 2, which forms part of a booster device 12, is incorporated into the rear part 5 of said turbojet 3. More specifically, said booster 2 comprises a chamber 6 which is fixed to a casing 7 of the turbojet 3, being positioned along the longitudinal axis L thereof. This chamber 6 is equipped with a single nozzle 8 at the rear and is provided with at least one charge 9, and with the usual means (not depicted) for initiating said charge 9.

Thus, by virtue of the invention, a booster 2 which works without ejecting heavy mechanical components is incorporated into the ejection nozzle 4 of the turbojet 3. As a result, the propulsion system 1 is notably particularly well suited to use on an anti-tank missile or a light anti-ship missile, for use in a tactical theater of operations. This is because, by virtue of the invention, the friendly troops are not endangered at the end of the boost phase implemented by said booster 2, because no mechanical parts are ejected apart from a very lightweight (generally weighing of the order of 10 g) diaphragm, the ejection of which presents no danger. This diaphragm, generally made of metal, closes in the usual way the gas ejection opening of the booster 2 and is automatically expelled when a given pressure is reached in the chamber 6 following ignition of the charge 9.

In addition, by incorporating the chamber 6 of the booster 2 along the axis L of the turbojet 3 problems of offset thrust inherent in the usual solutions of off-centered boosters (offset or laterally-mounted boosters) are limited.

Moreover, the propulsion system 1 according to the invention additionally comprises:
- at least one, but preferably two, gas bleed tubes 10 which are connected to the booster 2 and which are intended to ignite the combustion chamber of the turbojet 3. These gas bleed tubes 10 open into the flame tube of the combustion chamber, flush with the interior wall; and
- at least one, but preferably two, gas bleed tubes 11 which are likewise connected to the booster 2 and which are intended to start the turbine of the turbojet 3. These gas bleed tubes 11 are tangential to the casing and open flush at the tips of the blades of the turbine impeller.

These gas bleed tubes 10 and 11 allow the functions of igniting the turbojet 3 and of starting the turbine to be combined, which functions have usually been implemented by separate equipments (pyrotechnic ignition plugs and pyrotechnic starting cartridge in general). This solution makes these functions easier to produce and to implement. It uses the pressurizing of the chamber 6. The bleeds operate using the difference in pressure between the upstream end (combustion chamber and turbine) and the downstream end (the interior of the chamber 6).

In one preferred embodiment, the chamber 6 of the booster 2 is fixed to a rear casing 7 of the turbojet 3 by arms 13, preferably four arms 13, which are distributed evenly about the periphery of the longitudinal axis L of the turbojet 3. In this case, for preference, said gas bleed tubes 10 and 11 pass at least through some of said arms 13, and this notably allows a reduction in the space occupied.

Moreover, the chamber 6 of the booster 2 is of cylindrical shape, and the ejection nozzle 4 of the turbojet 3 surrounds said chamber 6 so as to define an annular space 14 around the latter chamber, which space is intended for the ejection of gases from the turbojet 3. This arrangement makes it possible to limit the losses associated with the lengthening of the ejection nozzle 4 and to limit the afterbody drag and thermal obstruction associated with the hot gases of the booster 2 during the boost phase.

In addition, as depicted in the FIGURE, the downstream part 15 of the boost device 12 protrudes backward beyond the downstream part 16 of the ejection nozzle 4 and this in particular makes it possible to prevent the gases ejected by the booster device 12 from disturbing the operation of the turbojet 3 after the boost phase.

In addition, the nozzle 8 of the booster 2 is arranged in such a way that its axis of symmetry coincides with the longitudinal axis L of the turbojet 3, and said nozzle 8 widens toward the rear and has an angle of divergence a that allows a gas ejected through said nozzle 8 to reach a gas ejected by the ejection nozzle 4 of the turbojet 3, to the rear of the propulsion system 1, at least a predetermined distance away which is such that it prevents the gases ejected by the booster 2 from disturbing the operation of the turbojet 3 after the boost phase.

Further, the charge 9 of the booster 2 has at least one central or peripheral passage 18 for the circulation of the combustion gases to said nozzle 8 of the booster 2 and to feed into the gas bleeds 10 and 11.

As indicated hereinbelow, the propulsion system 1 according to the invention is particularly well suited to use on an anti-tank missile (or a light anti-ship missile) which, in the usual way, is ejected from a launch tube (not depicted) upon firing. In order to perform such ejection from a launch tube, the booster device 12 of the propulsion system 1 according to the invention additionally comprises ejection means 20 which are arranged at the rear of the booster 2 and which are intended for ejection of the missile from its launch tube. These ejection means 20 are provided with at least one charge 23 and with the usual means (not depicted) of initiating said charge 23.

In a preferred embodiment, said ejection means 20 comprise an auxiliary booster 21 provided with a plurality of individual nozzles 22 which are arranged around and radially on the outside of the central nozzle 8 of the booster 2 and which are evenly distributed around the periphery of said nozzle 8. In addition, to speed up combustion and be able to attain high velocities quickly, said auxiliary booster 20 comprises a charge 23 comprising concentric rings 24, which between them form passages 25 intended for the ejection of the combustion gases.

The booster device 12 is therefore made up of two parts, namely:
- a downstream part (ejection means 20) dedicated to ejection and attaining speed in order to leave the launch tube;
- an upstream part (booster 2), for the boost phase.

The charges 9 and 23 of the booster 2 and of the ejection means 20 may comprise one and the same propellant, for example butalane 82/4. However, the architectures of these charges 9 and 23 are different. For preference:
- the charge 23 intended for ejection is tailored to a short combustion time and comprises, for example, a molded-bonded charge with concentric rings 24 which are obtained by punching. In addition, the ejection means 20 are equipped with a rear end having several individual nozzles 22. The exterior shape of the rear end can easily be tailored to suit constraints on size and aerodynamics which are specific to the turbojet 3 and/or to the missile; and
- the charge 9 intended for boosting is tailored for a long combustion time and comprises, for example, a charge that combusts across a front, bonded to the front end, or better still, to the rear end, and which has a central passage 18 for the circulation of the combustion gases to the single central nozzle 8 and to the gas bleed tubes 10 and 11 for driving the turbine and igniting the turbojet 3. The exterior shape of the front end can easily be tailored to the constraints regarding size and internal aerodynamics, which are specific to the afterbody of the turbojet 3.

When a missile like the aforementioned one is fired, the propulsion system 1 according to the present invention therefore allows the following three successive phases to be carried out:
- an initial phase of ejecting the missile from the launch tube, which is performed by said ejection means 20;
- a boost phase performed by said booster 2, after the missile has been ejected; and
- a cruising phase performed by the turbojet 3, when a missile has attained a predetermined velocity.

By way of illustration, said built-in booster device 12, mounted on a missile, may operate for a period of between 5 and 10 seconds with an ejection phase of between 0.1 and 0.3 seconds. For an application of the anti-tank type, the thrust balance may be as follows:
- ejection: mass of propellant 0.2 to 0.5 kg ; IFt 0.3 to 1 kN.s; Fmean 2000 to 10 000 N;
- acceleration or boost: mass of propellant 1.5 to 3 kg; IFt 3 to 6 kN.s; Fmean 500 to 1000 N;
- cruise: unladen mass 3 to 5 kg; Fmean 200 to 400 N

The invention claimed is:

1. A propulsion system configured to propel a flying device, or an anti-tank missile, the propulsion system comprising:
    a booster; and
    a turbojet which comprises: a compressor; a combustion chamber; a turbine; and an ejection nozzle;
    wherein the booster is incorporated into a rear part of the turbojet, the booster comprising a chamber which is fixed to a casing of the turbojet, by being positioned along the longitudinal axis thereof, which includes a nozzle at a rear, and which includes at least one charge and means of initiating the charge; and
    the propulsion system further comprises:
    at least one first gas bleed tube connected to the booster and configured to ignite the combustion chamber; and
    at least one second gas bleed tube also connected to the booster and configured to start the turbine.

2. The system as claimed in claim 1,
    wherein the chamber of the booster is fixed to a rear casing of the turbojet by arms that are uniformly distributed about a periphery of the longitudinal axis of the turbojet.

3. The system as claimed in claim 2,
    wherein the first and second gas bleed tubes pass at least through some of the arms.

4. The system as claimed in claim 1, wherein the chamber of the booster is of cylindrical shape, and the ejection nozzle of the turbojet surrounds the chamber to define an annular space around the chamber, which space is configured for ejection of the gases from the turbojet.

5. The system as claimed in claim 4,
    wherein the booster protrudes rearwards beyond the ejection nozzle.

6. The system as claimed in claim 4,
    wherein the nozzle of the booster is arranged such that its axis of symmetry coincides with the longitudinal axis of the turbojet, and wherein the nozzle widens toward the rear and has an angle of divergence that allows a gas ejected through the nozzle to reach a gas ejected by the ejection nozzle of the turbojet, at the rear of the propulsion system, at minimum a preset distance away.

7. The system as claimed in claim 1.
    wherein the charge of the booster including at least one central passage.

8. The system as claimed in claim 1.
    wherein the charge of the booster includes at least one peripheral passage.

9. The system as claimed in claim 1,
    further comprising ejection means arranged at the rear of the booster.

10. The system as claimed in claim 9,
    wherein the ejection means comprises an auxiliary booster including a plurality of individual nozzles arranged around and radially on an outside of the nozzle of the booster and that are evenly distributed around the periphery of the nozzle.

11. The system as claimed in claim 10,
    wherein the auxiliary booster comprises at least one charge comprising concentric rings.

12. A flying device, or anti-tank missile, comprising a propulsion system according to claim 1.

* * * * *